United States Patent [19]

Baker

[11] 4,117,364
[45] Sep. 26, 1978

[54] VOLTAGE WAVEFORM SYNTHESIZER AND A SYSTEM THAT INCLUDES THE SAME

[75] Inventor: Richard H. Baker, Bedford, Mass.

[73] Assignee: Massachusetts Institute of Technology, Cambridge, Mass.

[21] Appl. No.: 686,438

[22] Filed: May 14, 1976

[51] Int. Cl.² .......................................... H02M 7/48
[52] U.S. Cl. .................................... 318/230; 363/43
[58] Field of Search ...................... 318/230, 231, 227; 363/124, 135, 136, 137, 138, 43, 41

[56] References Cited

U.S. PATENT DOCUMENTS

3,775,662  11/1973  Compoly et al. ...................... 363/43
3,867,643  2/1975  Baker et al. ........................... 363/43

*Primary Examiner*—Herman J. Hohauser
*Attorney, Agent, or Firm*—Arthur A. Smith, Jr.; Robert Shaw

[57] ABSTRACT

A voltage waveform synthesizer whereby an ac waveform (which may be varied in frequency) is synthesized from dc or unidirectional voltages in a programmable fashion, the power carried by the waveform being controllable from zero to some maximum value and the harmonic content of the waveform also being controllable. The synthesizer per se is described and it is shown in combination with a rotating electric machine to provide, for example, a variable speed drive mechanism.

43 Claims, 31 Drawing Figures

VOLTAGE WAVEFORM SYNTHESIZER AND A SYSTEM THAT INCLUDES THE SAME

The present invention relates to systems wherein an ac waveform is synthesized from dc or unidirectional sources of electric enery.

There accompanies herewith an application for Letters Patent entitled "Electronic Motor that Includes an Electronic Waveform Synthesizer and the Synthesizer Per Se" Ser. No. 686,355 filed May 14, 1976, now U.S. Pat. No. 4,060,754 (Kirtley et al). Attention is called also to the following U.S. Letters Pat. No. 3,748,492 (Baker); 3,866,060 (Bannister et al); 3,867,643 (Baker et al); 3,899,689 (Baker); 3,909,685 (Baker et al); 3,942,028 (Baker); 3,983,503, (Bannister et al); 3,971,976 (Baker); and 4,039,909.

The synthesis of ac waveforms by combining a plurality of dc or unidirectional sources requires not only that the technical requirements be fulfilled but that the economic constraints be met, as well. It is an object of the present invention to provide a waveform synthesizer that satisfies both requirements.

While the synthesizer herein disclosed may be used to power single-frequency loads with a constant or a variable voltage amplitude, it is capable, as well, of varying the frequency over a wide range from zero to some maximum value. Often, when such variation is effected, harmonics become a problem; the present inventor has found, however, that the harmonics content of the synthesized waveform can be controlled, irrespective of the output voltage and/or frequency required. A further object of the invention, therefore, is to provide a synthesizer in which the harmonic content in the output waveform is controllable, independent of output voltage and frequency.

Another object is to provide a waveform synthesizer that can monitor the interchange of electric energy in the system of which the synthesizer is a part.

The waveform synthesizer is hereinafter discussed in a system that includes a rotating electric machine which may be an electric motor or an electric generator or a machine that performs both functions. In any event, it is often necessary to control interchange of electric energy between the synthesizer and the machine such that the synthesizer accepts as well as delivers electric energy and to modulate the level of energy interchange. By way of illustration, in the case of a variable-speed electric motor, it is well known that where motor speed is varied over a wide range (say from zero to some maximum) it is advantageous to control the electric power input to the motor; in said patents, the proposal is made to change the voltage applied to the motor terminals to accomplish this end. The present inventor has found, however, that such complete power control in terms of controlling the voltage, frequency and harmonic distortion independently can be effected by changing the widths of the steps forming the synthesized waveform and in an almost infinite set of increments from zero to the maximum requirement. It is, therefore, a still further object to provide an electronic machine having novel speed capabilities and other characteristics.

Still another object is to provide a novel solid state phase shifter.

A further object is to provide a solid state waveform synthesizer that employs thyristors in an unusual arrangement and wherein there is shown a novel low voltage scheme to back bias the thyristors and thereby turn off the same.

These and still further objects are addressed hereinafter.

The foregoing objects are achieved, in part, in an electronic waveform synthesizer which includes a plurality of units each of which comprises one or more stages, each said stage comprising dc or unidirectional supply voltage means and stage switch means. The waveform synthesizer further includes electronic mixer switch means and control logic means. The foregoing elements interact to provide an alternating waveform in the form of steps formed under the direction of the control logic means. The widths of the steps are controllable to affect the power transfer in the synthesized wave as well as to affect the harmonic content therein; also, in some cases, each half-wave of a cycle of the synthesized waveform is formed by a plurality of pulses whose widths are much less than the half-wave and whose widths and spacings of timings are established by the control logic means; this configuration gives independent control of the voltage amplitude and frequency to give any desired voltage waveshape. Thus, an acceptable level of harmonic content can be obtained in the synthesized waveform. A very favorable form of electronic mixer switch means is shown comprising thyristors with a novel way to back bias the thyristors. The synthesizer disclosed herein has a wide practical use; it is shown herein, however, in the context of an electronic motor which is one such use, and an important one.

The invention is hereinafter described with reference to the accompanying drawing in which.

The present invention is multifaceted: it is directed to a novel way of mixing dc or unidirectional voltages in an unusually beneficial way to synthesize an alternating (ac) waveform; it is directed to processing the dc or unidirectional voltages in a new and unusual manner to achieve acceptable harmonic levels in the synthesized waveform as well as to regulate electric power flow; and it employs, in an important aspect thereof, a mixing arrangement wherein thyristors are employed and there is disclosed an extraordinary way of reverse biasing the thyristors so they turn off automatically. The last mentioned aspect of the invention, that which relates to thyristors, is particularly important for systems wherein electrical power transfer is in the kilowatt range (i.e., power-type loads) and with voltage requirements above, say, about two hundred volts, since the combination of high current and high voltage, in the economic constraints of the market place, render synthesizers often prohibitively expensive when the output power is channeled through power transistors. Relatively low priced thyristors, on the other hand, can process electric energy at high voltage and high current, but such low priced thyristors are very difficult to turn off. One very important aspect of the present invention is the novel way invented to effect such turn-off. An important use for a synthesizer with the characteristics described in this paragraph is that of variable speed, polyphase, ac motors and the like and the invention is placed in the context of such machinery. In the explanation that now follows, the invention is taken up, in its various aspects, somewhat in the order just given; an attempt is made to use the same or similar labels for those elements that perform the same or similar functions in the various figures.

Figure 1:
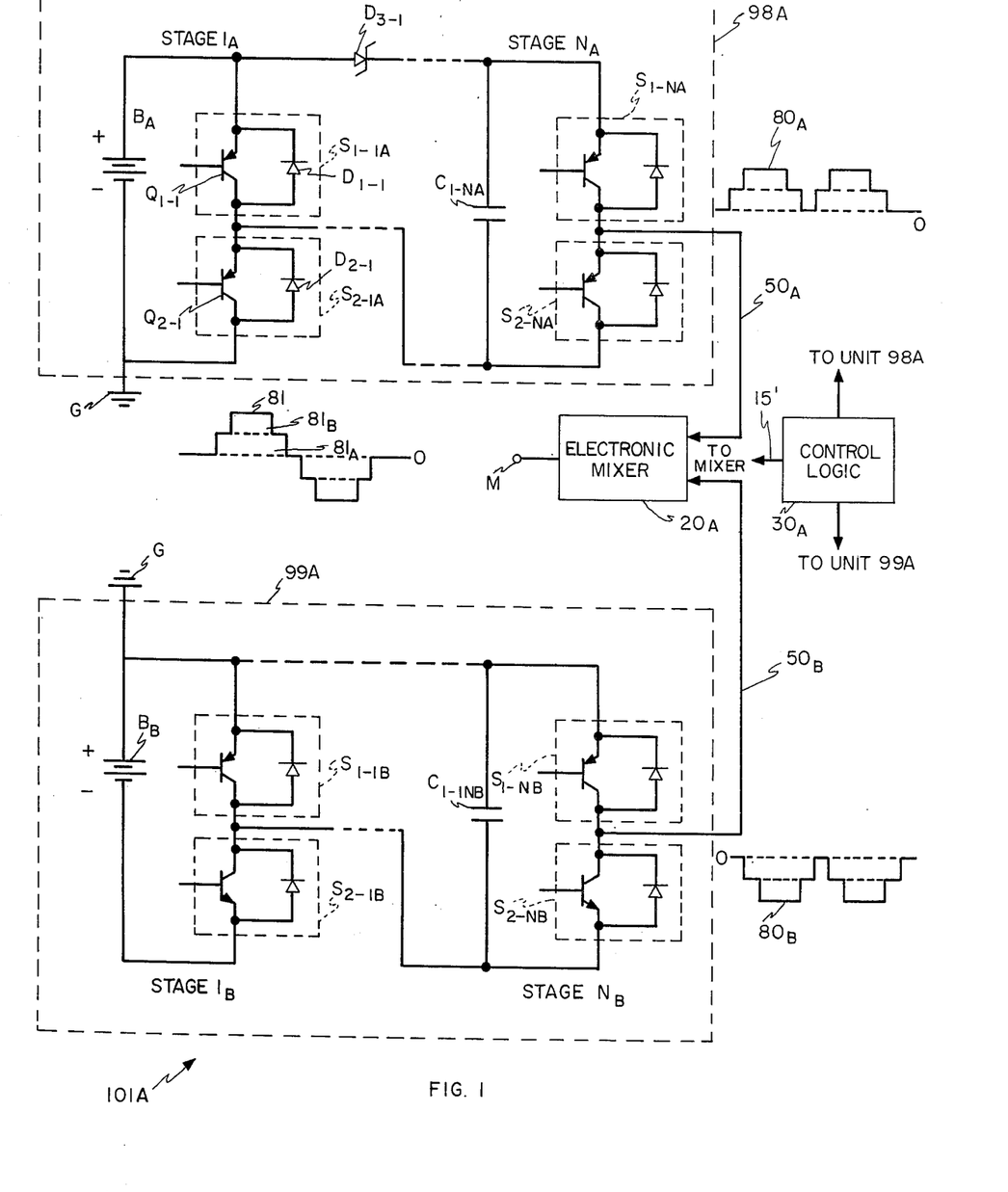
FIG. 1 shows schematically, and partly in block diagram form, an electronic waveform synthesizer that combines dc or unidirectional voltages to form a single phase, ac output in the form of a quasi-sinusoid.

Turning now to FIG. 1, an electronic waveform synthesizer is shown at 101A having, in combination, a first or positive unit 98A and a second or negative unit 99A comprising Stage $1_A$ . . . Stage $N_A$ and Stage $1_B$ . . . Stage $N_B$, respectively. The synthesized output waveform of the unit 98A is a positive-going waveform $80_A$ and the synthesized output waveform of the unit 99A is a negative-going waveform $80_B$ that are connected by conductors $50_A$ and $50_B$, respectively, to an electronic mixer $20_A$ which combines the same, in a manner later described herein, to provide an ac waveform 81 that is successively the output of the first unit 98A, then the output of the second unit 99A, then the output of the first unit 98A, and so forth. The network 101A includes control logic $30_A$ (which is preferably digital but which may be analog) that programs the events in the two units 98A and 99A and in the electronic mixer $20_A$ to give the results desired.

The first unit 98A comprises Stage $1_A$ that includes dc or unidirectional supply voltage means (i.e., the battery labeled $B_A$ which is usually rechargeable and supplies E volts herein) and bilateral stage switch means $S_{1-1A}$ and $S_{2-1A}$ each of which is shown to be a transistor and diode in back-to-back connection, as described in great detail in said patents. The stage switches $S_{1-1A}$ and $S_{2-1A}$ serve to control electric current flow in the battery $B_A$ as well as to effect electrical bypass of the battery $B_A$. The unit 98A is an N-stage system (where $N \geq 1$) of which two stages are shown, the Nth stage, Stage $N_A$, comprising dc or unidirectional supply voltage means (i.e., the capacitor labeled $C_{1-NA}$ in the Stage $N_A$) and bilateral solid state switches $S_{1-NA}$ and $S_{2-NA}$ that perform similarly to the switches $S_{1-1A}$ and $S_{2-1A}$.

The corresponding elements in the unit 99A are Stage $1_B$ . . . Stage $N_B$, as above indicated, that respectively include energy storage means $B_B$ . . . $C_{1-NB}$, first bilateral stage switches $S_{1-1B}$ . . . $S_{1-NB}$ and second bilateral stage switches $S_{2-1B}$ . . . $S_{2-NB}$.

A few further matters, some of a general nature, with regard to the embodiment of FIG. 1 are contained in this paragraph. It is shown in later figures that the batteries $B_A$ and $B_B$ (each of which supplies E volts herein) can be capacitors energized by a battery or other primary source of electric energy; on the other hand, the Nth Stage, or any intermediate stage can have a battery as its supply voltage means — or the stage supply voltage means can be a fuel cell, or a solar cell or the like. In the embodiment of FIG. 1, the capacitor $C_{1-NA}$ is charged by the battery $B_A$ through a zener diode $D_{3-1}$; any further intermediate stages would have diodes between stages, but zener diodes need not necessarily be used.

The semiconductors that form the switches $S_{1-1A}$ and $S_{2-1A}$ alone are marked: the are respectively $Q_{1-1}$–$D_{1-1}$ and $Q_{2-1}$–$D_{2-1}$. The waveform 81, that appears at output M of the electronic mixer 20, is a two-step waveform (as are, also, the waveforms $80_A$ and $80_B$) that consists of a first step $81_A$ (also called step 1 or window 1 herein) and a step $81_B$ (also called step 2 or window 2 herein) of the positive half cycle of the waveform 81 and corresponding steps $81_A{'}$ and $81_B{'}$ of the negative half. It is later shown that the power carried by the wave 81 is varied from zero to some maximum by varying the width of the steps $81_A$, $81_B$, $81_A{'}$ and $81_B{'}$. It is pointed out that the harmonic content of the waveform 81 is also affected by varying the step width. In addition, the individual steps, e.g., $81_A$ and $81_B$, that make up each half cycle of the waveform 81, can comprise a plurality of pulses and either the pulse width or pulse timing, or both, can be regulated by the control logic means to establish an acceptable level of harmonic content in the waveform 81, but that aspect of the invention is left to later paragraphs. What follows now is an explanation with reference to FIGS. 2A and 2B of the operation of a preferred form of the electronic mixer which takes as input the positive-going wave $80_A$ and the negative-going wave $80_B$ and produces therefrom at the terminal M the ac waveform 81.

Figure 2A:
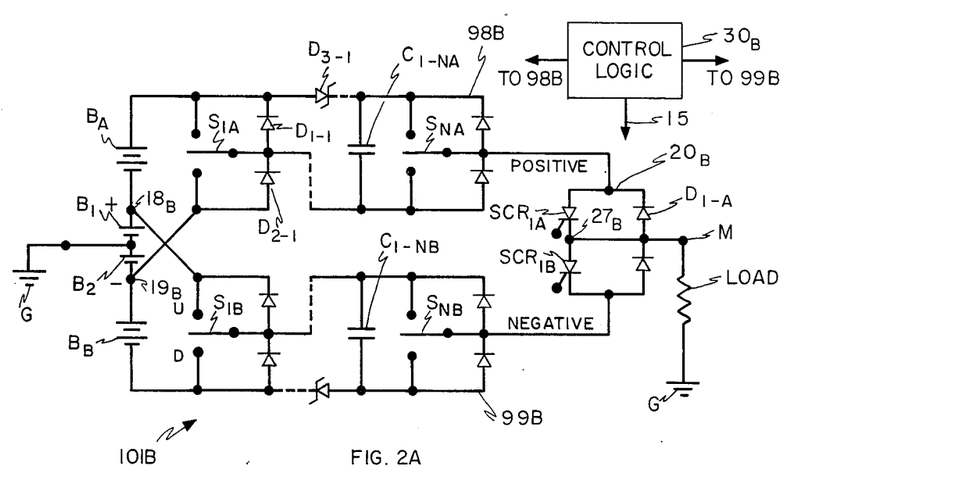
FIG. 2A is a schematic representation, partly block diagram in form, of a synthesizer similar to that shown in FIG. 1.

The electronic waveform synthesizer labeled 101B in FIG. 2A is similar to the synthesizer 101A and is shown mostly to shown details of the mixer labeled $20_B$ and a scheme for controlling the thyristors therein. It will be appreciated that the schematic switches shown at $S_{1A}$ . . . $S_{NA}$ and $S_{1B}$ . . . $S_{NB}$ correspond to the transistors $Q_{1-1}$, $Q_{2-1}$, etc., but other type switching mechanisms can be used. The switches $S_{1A}$, etc., are semiconductor switches and are bilateral as discussed in said patents. The electronic mixer $20_B$ is shown in FIG. 2A comprising thyristors $SCR_{1A}$ and $SCR_{1B}$ connected in parallel with reverse polarity diodes $D_{1-A}$ and $D_{1-B}$, respectively; the thyristors and diodes so connected form bilateral mixer switches. To simplify the explanations, a number of terms should be defined. An "active" thyristor device is one that has a gate voltage such that it will conduct when forward biased, that is, an active thyristor will conduct when a forward bias voltage occurs across the device and will cease to conduct when back biased and the current passes through zero. When a thyristor is switched from active to inactive while conducting, it will continue to conduct until the current goes through zero; it will then remain nonconducting. If switched to inactive while nonconducting, the device will remain nonconducting even with a forward bias voltage applied. Inactive devices remain nonconducting regardless of the voltage bias. When an inactive device is switched to active, it conducts on first appearance of forward bias voltage and then operates as described for an active device. The thyristors are rendered active by applying appropriate signals to the gates of each, and they are rendered inactive by removing the gate signal. The gate signals are generated by the control logic and are connected to the thyristors by a conductor or conductors 15'.

The synthesizer 101B, can provide a synthesized waveform like the waveform 81 in FIGS. 1, 2B and 3 to a load; that waveform is provided by appropriate switching of the switches $S_{1A}$ . . . and switching of the thyristors $SCR_{1A}$ and $SCR_{1B}$ in a sequence, as now discussed with reference to FIGS. 2A and 2B. The triggering of the thyristors $SCR_{1A}$ and $SCR_{1B}$ is synchronized by control logic $30_B$ with operation of the switches $S_{1A}$, $S_{NA}$, $S_{1B}$ and $S_{NB}$ (to simplify the explanation, it is assumed here that the synthesizers are two-stage per unit devices, even though there may be N stages per unit, and it is hereinafter shown that with a modified mixer N can equal one). The thyristor $SCR_{1A}$ is rendered active at time $\Delta T_o$ in FIG. 2B and is rendered inactive at $\Delta t_4$; in addition the thyristor $SCR_{1A}$ is back biased, in a way later described, at time $\Delta t_4$. The thyristor $SCR_{1B}$ is rendered active at time $\Delta t_5$ and inactive and back biased at time $\Delta t_9$. In this way the positive-going portion and the negative-going portions, respectively, of the waveform are generated. The steps (or windows) 81A and 81B (and the corresponding steps of the negative-going portion of the wave 81) are generated by the switches $S_{1N}$ and $S_{1A}$, respectively. To generate the step (or window) $81_A$, the switch $S_{NA}$ is in the up ("U") position in FIG. 2A and the switch $S_{1A}$ is in the down ("D") position. To generate the step $81_B$ the switch $S_{1A}$ is moved to the up position so that between times $\Delta t_2$ and $\Delta t_3$ in FIG. 2B the switches $S_{1A}$ and $S_{NA}$ are both up. During the occurrence of the positive-going half of the waveform 81, the switches $S_{1B}$ and $S_{NB}$ are up. At time $\Delta t_3$ the switch $S_{1A}$ is switched down and at time $\Delta t_4$ and the switch $S_{NA}$ is switched down. At time $\Delta t_5$ the switches $S_{1A}$ and $S_{NA}$ are both down; at time $\Delta t_6$ the switch $S_{NB}$ is switched down, the switch $S_{1B}$ being down; between times $\Delta t_7$ and $\Delta t_8$ both the switch $S_{NB}$ and the switch $S_{1B}$ are down. During the negative-going half of the waveform 81, the switches $S_{1A}$ and $S_{NA}$ are down. There now follows a discussion of how the thyristors $SCR_{1A}$ and $SCR_{1B}$ are rendered nonconducting, and, in this connection, the batteries $B_1$ and $B_2$ in FIG. 2A play a vital part; the batteries $B_1$ and $B_2$ are low voltage ($\Delta V$), say about five percent the potential E of either of the batteries $B_A$ and $B_B$.

Figure 2B:
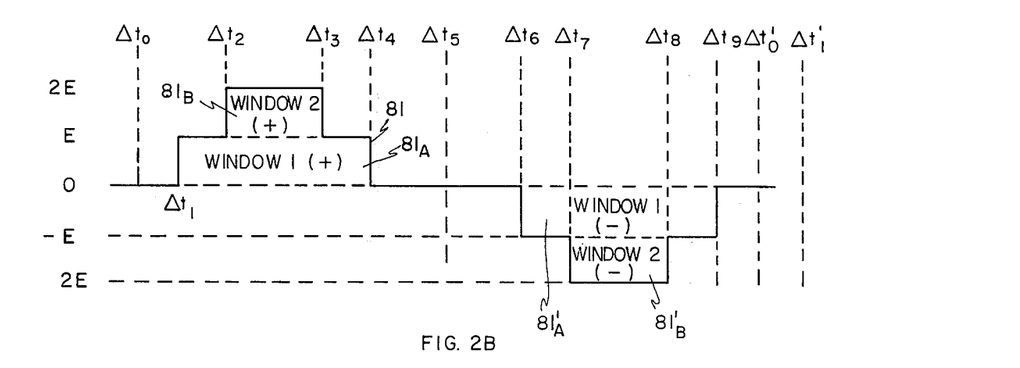
FIG. 2B shows an ac, time-voltage waveform synthesized by the circuit of FIG. 2A.

During the time intervals between $\Delta t_9$ and $\Delta t_0'$ in FIG. 2B and between the times $\Delta t_4$ and $\Delta t_6$, the switches $S_{NA}$ and $S_{1A}$ are both down and the switches $S_{NB}$ and $S_{1B}$ are both up. Therefore, during these time intervals, the output of the positive unit 98B is connected to $-\Delta V$ and the output of the negative unit 99B is connected to $+\Delta V$. Because of this, a voltage of 2 $\Delta V$ exists across the diodes $D_{1-A}$ and $D_{1-B}$ so that the thyristors $SCR_{1A}$ and $SCR_{1B}$ are both reversed biased and are turned off at the times $\Delta t_4$ and $\Delta t_9$. The thyristor $SCR_{1A}$ is activated at the time $\Delta t_0$ and de-activated at $\Delta t_4$; the thyristor $SCR_{1B}$ is activated at the time $\Delta t_5$ and de-activated at the time $\Delta t_9$.

The batteries $B_1$ and $B_2$ in concert constitute a source of positive and negative electric potential, points $18_B$ and $19_B$, respectively, in FIG. 2A, connected in an electrical bridge configuration respectively through the bilateral switches $S_{1A}$ . . . $S_{NA}$ of the first unit 98B and the bilateral switches $S_{1B}$ . . . $S_{NB}$ of the second unit 99B to the anode of the thyristor $SCR_{1A}$ and the cathode of the thyristor $SCR_{1B}$. The thyristors $SCR_{1A}$ and $SCR_{1B}$ are serially connected and the serial connection labeled $17_B$ serves as a port of the synthesizer 101B, the other port being ground G, as shown, the connection $27_B$ being brought out to the terminal or output M. (Later in FIGS. 9A and 10 the mixer means is shown comprising two pairs of serially connected thyristors wherein the load is connected between the serial connection between the thyristor pairs; the anode of one thyristor of one serial pair is connected to the anode of one thyristor of the other serial pair and back through the stage switches of the positive unit to the negative potential point, and the cathode of one thyristor of one serial pair is connected to the cathode of one thyristor of the other serial pair and back through the stage switches of the negative unit to the positive potential point.) The network configuration just described provides a low voltage means for applying the reverse-bias voltage $\Delta V$ to the thyristors at an appropriate time in the synthesizing cycle. Appropriate gating signals to the thyristors are applied by the control logic.

Figures 3A, 3B:
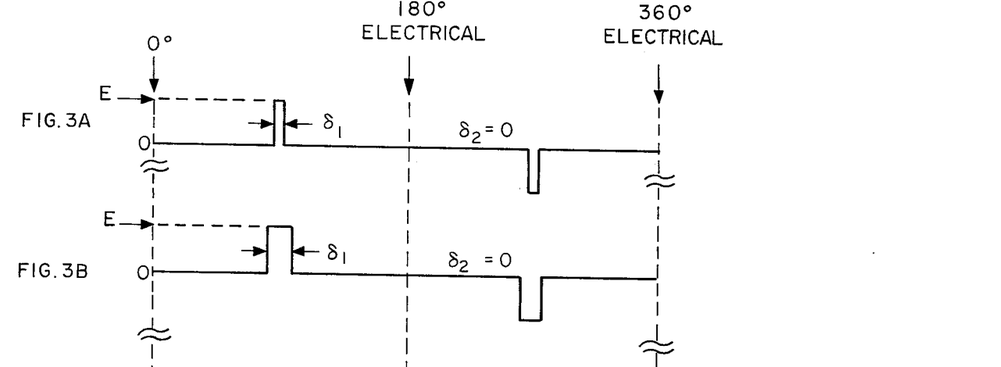
FIGS. 3A–3G show further time-voltage waveforms that can be synthesized by the circuit of FIG. 2A.
Figures 3C, 3D, 3E, 3F, 3G:
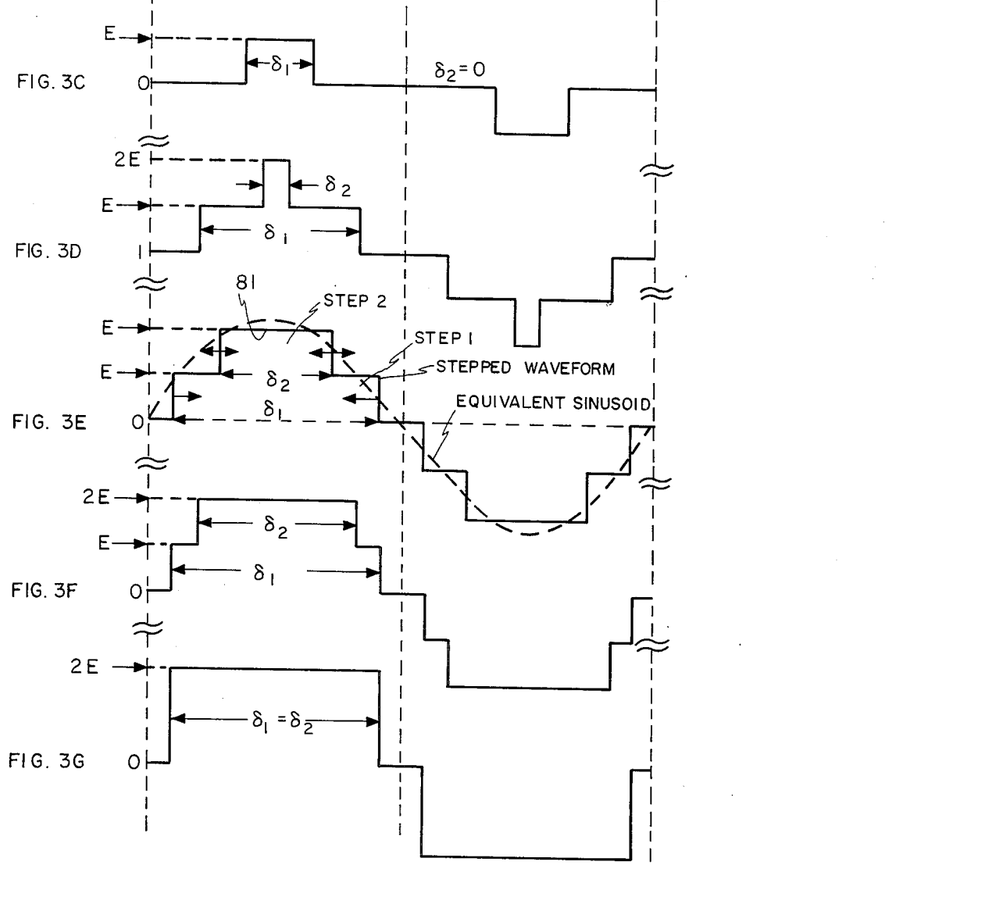
Figure 4A:
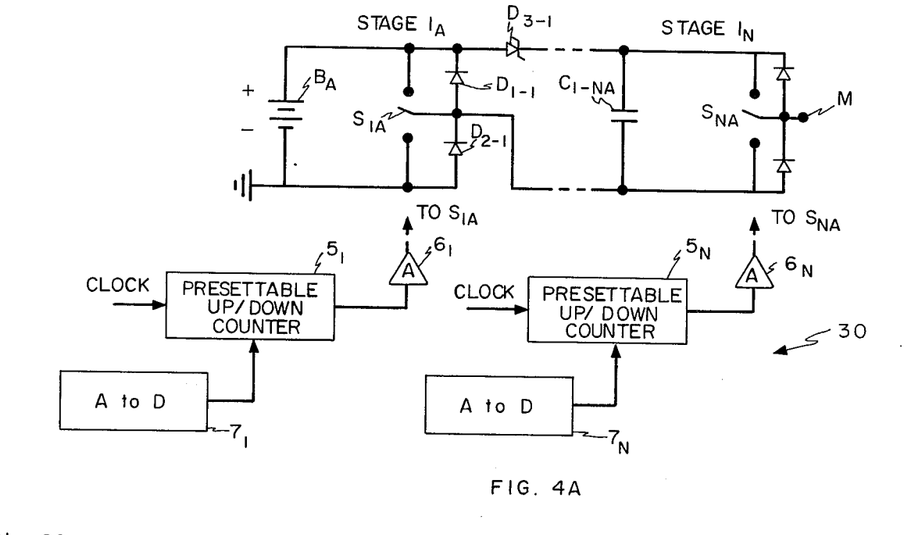
FIG. 4A is a schematic representation, partly block diagram in form of half of the circuit of FIG. 2A, plus some other circuit elements.

Waveform management is a unique feature of switched source synthesizers (e.g., the synthesizers 101A and 101B). Consider the stepped waveform shown in FIG. 3E where again the waveform is marked 81. The amplitude of the rms voltage of the equivalent sinusoid can be made larger by increasing the widths of the step 1 and the step 2 (increasing $\delta_1$ and $\delta_2$, respectively). This is shown in FIGS. 3F and 3G. Similarly, the rms voltage can be made smaller by decreasing the width of the steps (decreasing $\delta_1$ and $\delta_2$) as shown in FIGS. 3D, 3C, 3B, and 3A. Therefore, control of the synthesized output waveform is accomplished by simply varying the times at which switches $S_{NA}$ and $S_{1A}$ of FIG. 2 are flipped up and back down for the positive steps, and the times when switches $S_{NB}$ and $S_{1B}$ are switched for the negative steps. In fact, not only is the amplitude of the rms voltage controlled by the switch activation pattern, but also the harmonic content and frequency of the output waveform as well. The overall logic system for controlling the switch pattern in shown in FIG. 6 and discussed later, but before that a brief explanation of this very important waveform control is given next with reference to FIG. 4A which shows a single positive-going unit comprising stages like the units 98A and 98B, respectively, in FIG. 1 and to FIG. 4B which shows a waveform synthesized by the circuitry of FIG. 4A. Referring to FIG. 4A, in order to generate the positive portion of the stepped waveform in FIG. 4B, switches $S_{NA}$ and $S_{1A}$ must be switched at predetermined intervals. To generate window 1 (+) for the example waveform shown in FIG. 4B, the switch $S_{NA}$ is switched up at 15.5° (electrical degrees) and back down at 164.5°. Control of the switching intervals is accomplished by first dividing the quasi-sinusoid in FIG. 4B into 512 equal time intervals (256 parts for one-half of the sinusoid) and then setting a particular digital number (corresponding to the switching interval desired) into a presettable up/down counter $5_N$ of control logic 30. For the example waveform in FIG. 4B, the digital number 234 is set into the counter $5_N$ at time $t_0$ (zero degrees). The counter $5_N$ counts up to 256, it recycles through zero, and then it counts back up, reaching the number 105 at the 90° point in the waveform cycle. At the 90° point, the counter $5_N$ is "reversed" and counts back down from 105 through zero to 256 and reaches 234 again at exactly the 180° in the cycle. At the two zero point in the count, pulses from the counter trigger operation of the switches in the synthesizer; more precisely, at the first zero point (i.e., 15.5 electrical degrees) the switch $S_{NA}$ is switched up and at the second zero point (i.e., 164.5 electrical degrees) the switch $S_{1A}$ is switched down. Said another way, because the number 234 was originally set into the counter $5_N$ and it was allowed to start counting up at time = $t_0$ (0°), it makes the transition from 256 → 000 at the 15.5° point in the cycle and from 000 → 256 at the 164.5° (180°-15.5°) point in the cycle. This is a unique feature of the present method of generating window widths; the up/down counter sequence always gives, automatically, the timing symmetry required to generate a symmetrical waveform. Moreover, the window size (waveform shape) can be changed by merely setting a different number into the counter at the beginning of any particular cycle.

Figure 4B:
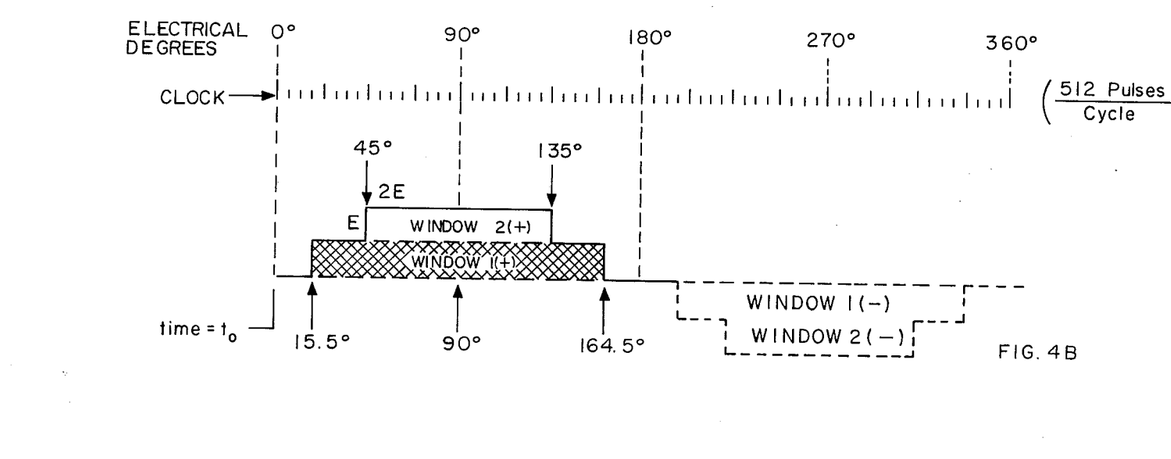
FIG. 4B shows an ac, time-voltage waveform synthesized by the circuit of FIG. 4A.

The width of window 2 in FIG. 4B is controlled in the same manner; the digital number 192 is set into a second up/down counter $5_1$ at the beginning of the cycle (at time $t_0$). The counter is allowed to count up, reaching the count 256 → 000 at 45° and the count 64 at 90° at which juncture the counter $5_1$ is reversed; it then counts down from 64, reaching 000 → 256 at 135° and the count 192 again at 180°.

In the above discussion regarding control of the window widths, it is interesting to note that both of the counters $5_N$ and $5_1$ count up, reverse direction and then count back down to reach the same number at the 180° point in the cycle that was originally transferred into the counter at the 0° point (i.e., the start of the cycle). This fact is important because it allows the counter $5_N$ and $5_1$ to function in the same manner and repeat the same action to control the window widths for the negative section (that is, to control the switches $S_{NB}$ and $S_{1B}$ of FIG. 2A) to generate the negative portion (i.e., window 1(−) and window 2 (−)) of the stepped waveform.

Again, the discussion with reference to FIGS. 4A and 4B relate to a two-stage unit to produce a two-step or two-window synthesized waveform, but it applies to an N-stage system to provide an N-step or N-window waveform. In the system of FIG. 4A the battery $B_A$ again supplies E volts. The output of the counters $5_N$... $5_1$ are amplified by amplifiers $6_N$... $6_1$, respectively.

The input numbers (i.e., the counts 234 and 192 in the above example) are introduced to the counters by analog-to-digital converters $7_N$... $7_1$ (or some other means known to workers in this art). Circuitry to effect switching of switches $S_{NA}$ and $S_{1A}$ is disclosed in one or more of the above-mentioned patents and need not be repeated here; workers in the art to which this invention pertains can interconnect the counters $5_N$... $5_1$ in the system with no difficulty.

The method described above to control the window width is an important concept because by the simple expediency of transferring two digital numbers at the beginning of the cycle of a waveform, (1) both of the amplitude (i.e., the rms voltage) and harmonic content of the waveform can be altered, (2) waveform symmetry is obtained automatically with a few standard low cost digital circuit chips, and (3) the control system is logically self-consistent, that is, it is locked to the system clock and can work (generate) at any frequency from dc to several thousand Hertz.

It will be appreciated on the basis of the foregoing explanation, that a polyphase system can be controlled in a similar fashion and with appropriate timing of the phases. The use of digital timing not only has the advantage of economics, it has also the advantage that the various events so controlled can be interlocked to one another quite easily to assure proper sequence; that facts holds true for a polyphase system.

As above stated, harmonic distortion in the synthesized waveform can be modified by changing the widths of the steps that compose the waveform. It should be further noted that the harmonic distortion can also be modified by forming one or more of the steps of the waveform as a plurality of pulses whose pulse width and/or pulse timing are controlled to affect said harmonic distortion, as now explained with reference to FIGS. 5A–5K.

Figure 5A:
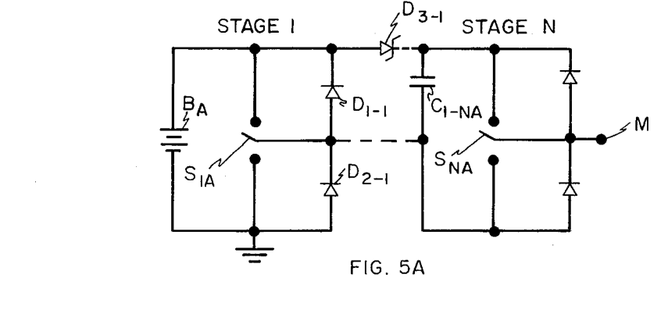
FIG 5A is a schematic of some of the circuit of FIG. 4A.
Figure 5B:
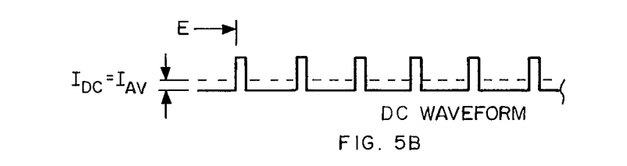
FIG. 5B is a dc, time-voltage waveform synthesized as a number of pulses by the circuit of FIG. 5A.
Figures 5C, 5D, 5E, 5I, 5J, 5K:
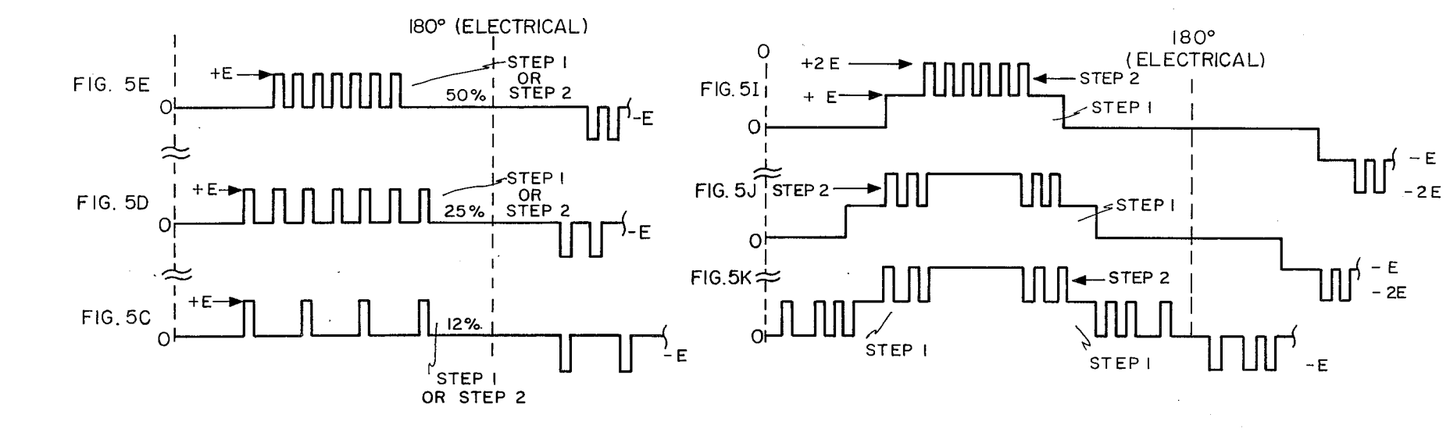
FIG. 5C–5K are ac, time-voltage waveforms synthesized by the circuit of FIG. 5A.
Figures 5F, 5G, 5H:
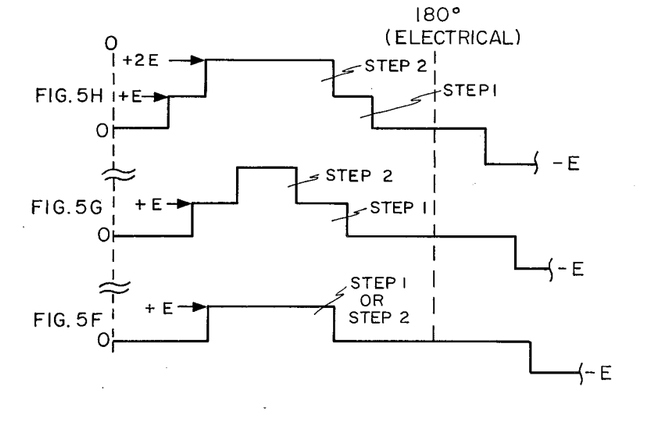

It will quickly be observed that the two-stages of FIG. 5A are identical to the stages in FIG. 4A and that the waveforms of FIGS. 5G and 5H are similar to the waveform of FIG. 4B except for the widths of the step 1 and step 2. The waveform of FIG. 5F is a single step which is equivalent to step 1. The waveform in FIG. 5B is a dc waveform made up of a plurality of pulses; the waveforms of FIGS. 5C, 5D and 5E comprise a single step also made up of a plurality of pulses. The difference between the waveforms of FIGS. 5B, 5C, 5D and 5E is that the waveforms in each figure have a different spacing of pulses for every other figure giving a different average value. FIGS. 5C, 5D and 5E show a single step waveform, FIGS. 5I, 5J and 5K show two-step waveforms wherein the steps are formed by a plurality of pulses. The pulses that form the single step waveform of FIG. 5C, for example, or the two-step waveform of FIG. 5K can be generated by sequencing the switches $S_{NA}$ and $S_{1A}$, as before. The advantage of generating waveforms like the waveform in FIG. 5K, for example, is that the amplitude, the frequency and the harmonic content of the synthesized quasisinusoid can be controlled mostly independently.

Figure 6:
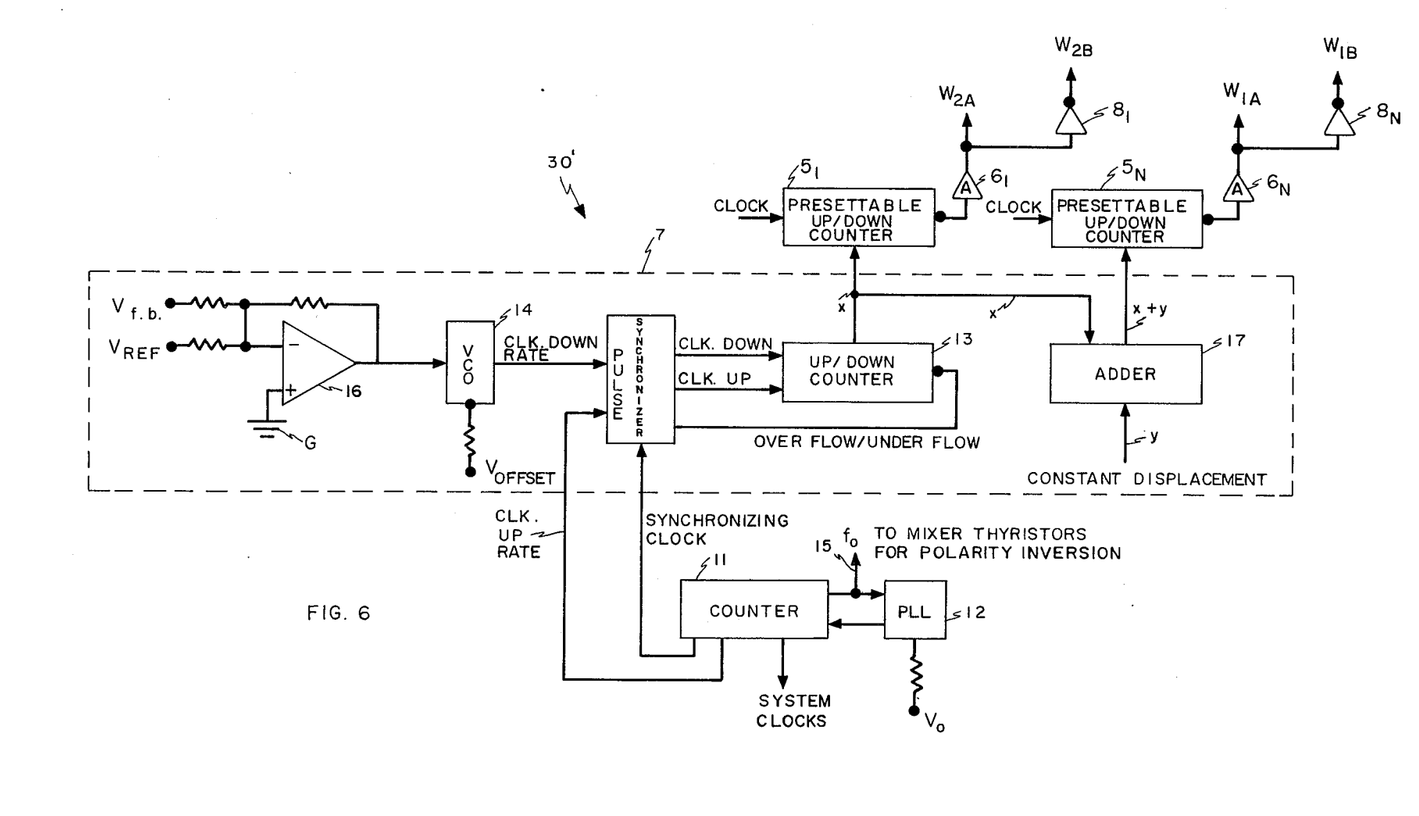
FIG. 6 is a schematic representation, partly block diagram in form, of digital logic to control the synthesizers herein.

There follows now an explanation of the digital control logic which is shown in detail in FIG. 6.

The control logic labeled 30' in FIG. 6 differs somewhat from the control logic 30 of FIG. 4A. It should be noted, however, that the presettable counters $5_N$ and $5_1$ and the amplifiers $6_N$ and $6_1$ can be the same as the similarly marked elements of FIG. 4A. For purposes of this explanation let it be assumed that the control logic 30' is employed to perform the functions required of the control logic $30_B$ in FIG. 2A to provide the waveform 81 in FIG. 2B. In this explanation the arrows labeled $W_{1A}$ and $W_{2A}$ represent electrical connections to the switches $S_{NA}$ and $S_{1A}$, respectively, in the unit 98B to provide, respectively, the first window or step $81_A$ in FIG. 2B and the second window or step $81_B$ therein; the arrows labeled $W_{2A}$ and $W_{2B}$ represent electrical connections to the switches $S_{NB}$ and $S_{1B}$, respectively, to provide the corresponding windows or steps in the negative half of the waveform 81 in FIG. 2B. The conductor labeled 15 in both figures represents one or more connections from the control logic to the electric mixer $20_B$ and, more specifically, to the gates of the thyristor $SCR_{1A}$ and $SCR_{1B}$ to introduce reference signals at frequency $f_0$ for polarity inversion, that is, the signals at the frequency $f_0$ time and activate the thyristors to effect the appropriate switching thereof and by this way provide the positive half cycle of the waveform 81 and a negative half cycle thereof. In a system controlled by the logic 30', the outputs $W_{1B}$ and $W_{2B}$ are controlled by signals from the counters $5_N$ and $5_1$ that have been inverted by inverters $8_N 8_1$, respectively.

Figure 12:
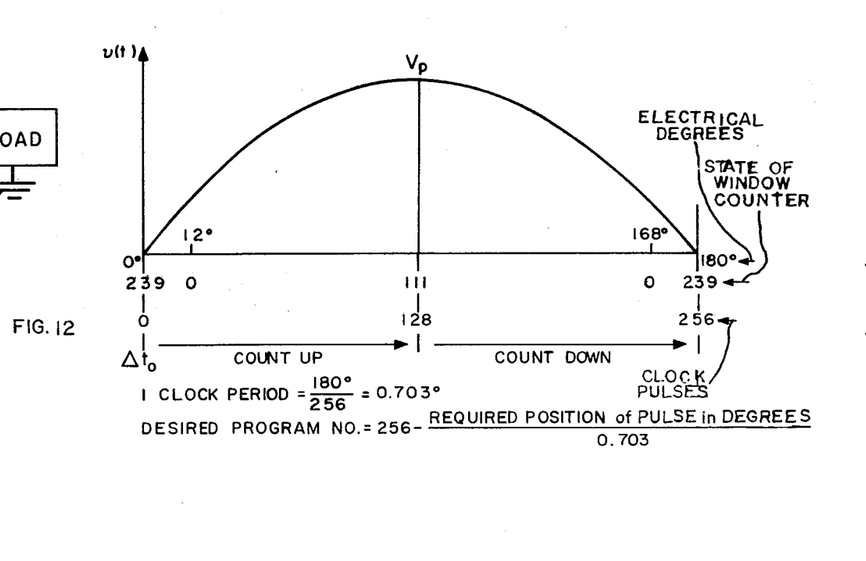
FIG. 12 is a voltage-time diagram to aid in the explanation of the operation of the digital logic circuits of FIG. 6.

The waveform 81 in FIG. 2B can be thought of as being divided into a large number of equal time intervals (in the explanation here, 512 parts, i.e., the count for a complete cycle is 512; the explanation here is somewhat repetitious of the previous explanation with reference to FIGS. 4A and 4B). The window counters $5_N$ and $5_1$ of FIG. 6 are modulus 8 and therefore require 256 clock pulses to recycle. In addition, the counters $5_N$ and $5_1$ are presettable up/down counting units which can be arranged to output a pulse whenever the counter passes through its minimum count. FIG. 12 illustrates the operation of these counters. Let it be assumed that it is desired to introduce the voltage source $C_{1-NA}$ of the series combination 98B in FIG. 2A 12 electrical degrees after $\Delta t_0$; this is done by triggering the switch $S_{NA}$ by a carry pulse from the counter $5_N$, as previously noted, as indicated in FIG. 12 and to remove the same source at 168°, i.e., the source $C_{1-NA}$ is to be added or introduced into the system and subtracted symmetrically. From the formulas of FIG. 12, the desired program number is:

$$256 - (12/0.703) = 239$$

Circuit operation is as follows: The counter $5_N$ starts counting up from its program number 239 at time $\Delta t_0$ in FIG. 2B. Seventeen clock pulses later, or approximately 12° from the origin, the counter reaches its maximum count and outputs a carry pulse at the beginning of the next clock period. Counting in the up mode is allowed to continue until the peak $V_p$ or 90° point of the sine wave in FIG. 12 is reached. At this point the digital number in the counter $5_N$ is 111. The down count will then start at this point from digital number 111 and at 168° from the origin, or 12° from the 180°, the counter $5_N$ will output another carry pulse. Counting down will continue to the 180° point at which point the counter $5_N$ is back to its original state. This technique of counting up and then down produces symmetrical spaced timing or carry pulses and, hence, a guaranteed symmetrical sinusoid. It should be noted that the times at which the voltage sources $C_{1-NA}$, etc., are added and subtracted varies directly with the program number that is programmed into the counter at $\Delta t_0$.

The window programmer shown at 7 in FIG. 6, based on the values of the feedback and reference voltages, varies the digital number in the window counters $5_N$ and $5_1$ at time $\Delta t_0$ in a direction such that the output voltage of the synthesizer 101B is maintained under various loading conditions and voltage levels of the source. The up/down counter labeled 13 within the window programmer 7 of FIG. 6 receives a fixed clock up rate from a phase locked loop (PLL) 12 (through a counter 11) and a variable clock-down rate from a VCO 14 whose control from a voltage amplifier 16 is the difference between feedback voltage $V_{f.b.}$ and some reference voltage $V_{REF}$. If the clock-up and clock-down rates are equal, i.e., there is no "error voltage", the digital number in the up/down counter 13 remains constant (within the least significant bit), and the number in the window counters $5_N$ and $5_1$ at time $\Delta t_0$, therefore, remains unchanged.

Let it be assumed now that the output voltage of the synthesizer 101B increases due to some disturbance on the system such as, for example, a sudden reduction in the load. The input voltage to the VCO 14 will then increase which, in turn, increases the clock-down rate. Because clock-up rate is constant, the counter 13 will now be counting down faster than it is counting up and, hence, the digital number in the counter 13 will decrease. This decreased digital number is transferred to the window counters $5_N$ and $5_1$ at the time of the zero-crossing of the quasi-sinuosid 81, and the output voltage of the system will decrease. The feedback voltage $V_{f.b.}$ will then decrease, which, due to the feedback connection, decreases the clock-down rate; and a new steady state at a reduced voltage will be reached.

The control logic 30' acts to generate window 2(+) and window 2(−) in FIG. 2B directly; that is, signals at $W_{2A}$ and $W_{2B}$ are direct signals from the logic 30', whereas, window 1(+) and window 1(−) are derived and determined by the magnitude of window 2 in each case. More precisely, the up/down counter 13 of the window programmer 7 provides a digital number $x$ to the counter $5_1$; the digital number $x$ is also simultaneously introduced as one input to an adder 17 to which is supplied, as further input, a fixed displacement $y$ to generate the window 1(+) and the window 1(−) at some fixed time from the window 2(+) and the window 2(−), respectively. Due to the asynchronous nature of the clock-down rate in the programmer 7, the clock-up rate to the up/down counter 13 is synchronized by a synchronizing signal from the combination of the phase locked loop 12 and the ÷ 12 counter 11, as shown. The signal $V_{f.b.}$ can be derived from the point M in FIG. 2A; the signals $V_{REF}$, $V_{offset}$ and $V_0$ are biasing voltages that are established at appropriate levels, as is known to workers in the art to which the specification is directed.

Figure 7:
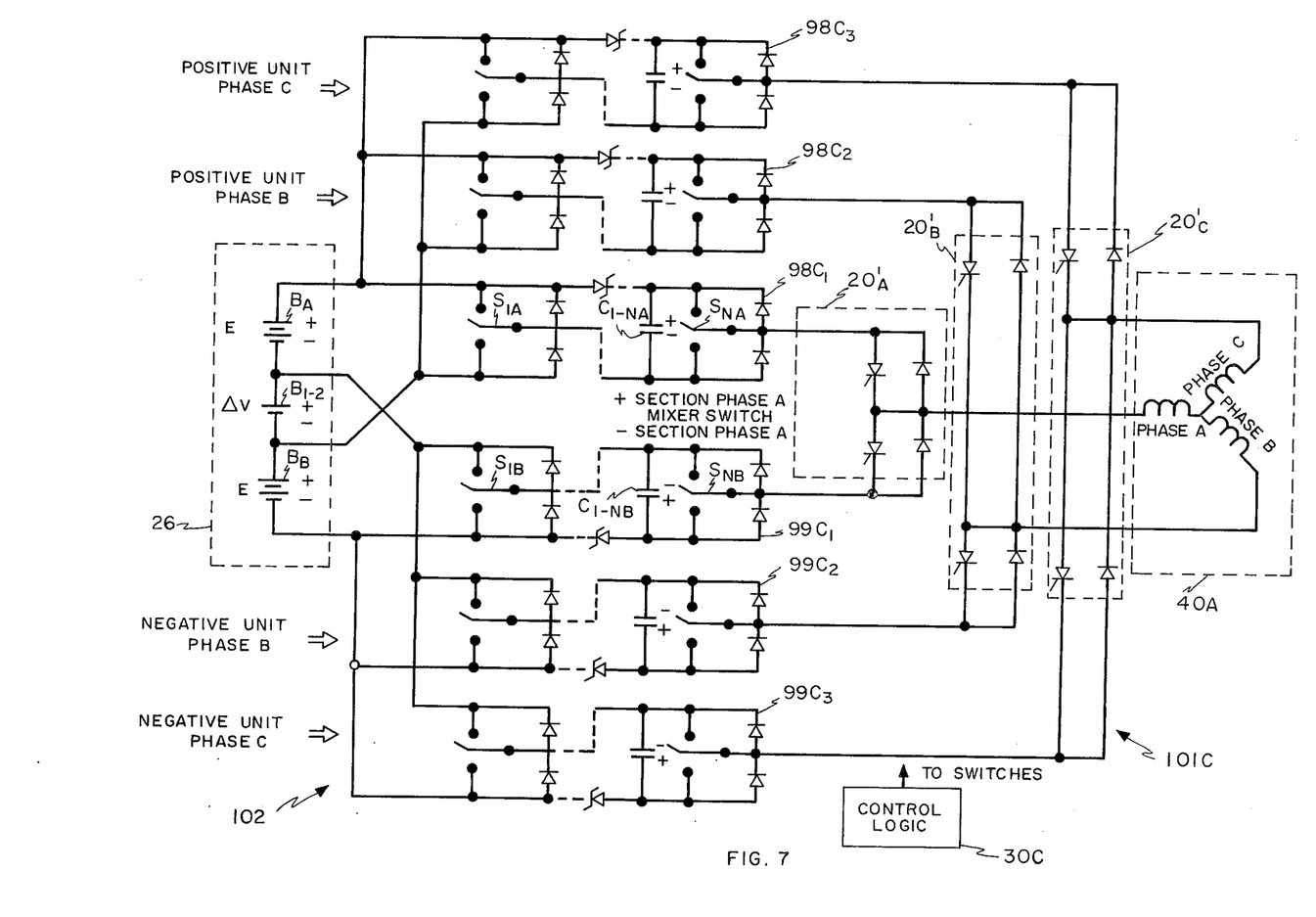
FIG. 7 is a schematic representation, partly block diagram in form, of a three-phase synthesizer that powers a three-phase rotating machine.

The system labeled 102 in FIG. 7 is a rotating electronic machine that consists of a three phase electronic synthesizer 101C and a rotating electric machine 40A. It will be appreciated, upon close inspection, that the synthesizer 101C essentially comprises three synthesizers like the synthesizer 101B in FIG. 2A connected in a three phase configuration having appropriate control logic 30C to trigger the event needed to provide a three-phase waveform to the machine 40A. Batteries $B_A$ and $B_B$ are in a battery section 26 that further includes a battery $B_{1-2}$ that can be the same as the two batteries $B_1$ and $B_2$ in FIG. 2A. All three phases of the synthesizer 101C are powered by the battery unit 26. The synthesizer comprises units $98C_1$ and $99C_1$ that are respectively the positive-going and negative-going units (like units 98B and 99B, respectively, in FIG. 2A) that power phase A of the machine 40A through a mixer $20'_A$ units $98C_2$ and $99C_2$ that power phase B through a mixer $20'_B$ and units $98C_3$ and $99C_3$ that power phase C through a mixer $20'_C$. The representation of FIG. 7 is essentially self-explanatory in the light of the detailed explanation above. The three-phase stator winding only of the machine 40A is shown; it, of course, has a rotor which may be a dc field making the machine 40A a synchronous machine, motor or alternator. In one use the machine may be employed to drive an electric vehicle and power flow may be to the synthesizer from the machine 40A or from the synthesizer to the machine 40A. In either event, power can be accepted or delivered in a controlled fashion by amplitude modulation of the rms voltage in the way described above. It will be appreciated, also, without further explication, that the machine 40A can be an alternator alone to effect charging of the batteries $B_A$, $B_B$ and $B_{1-2}$. Further, in an electric vehicle system the machine 40A acts both as a motor and as a generator and the synthesizer 101C regulates energy flow, both as to the level of such flow and the direction thereof.

Figure 8:
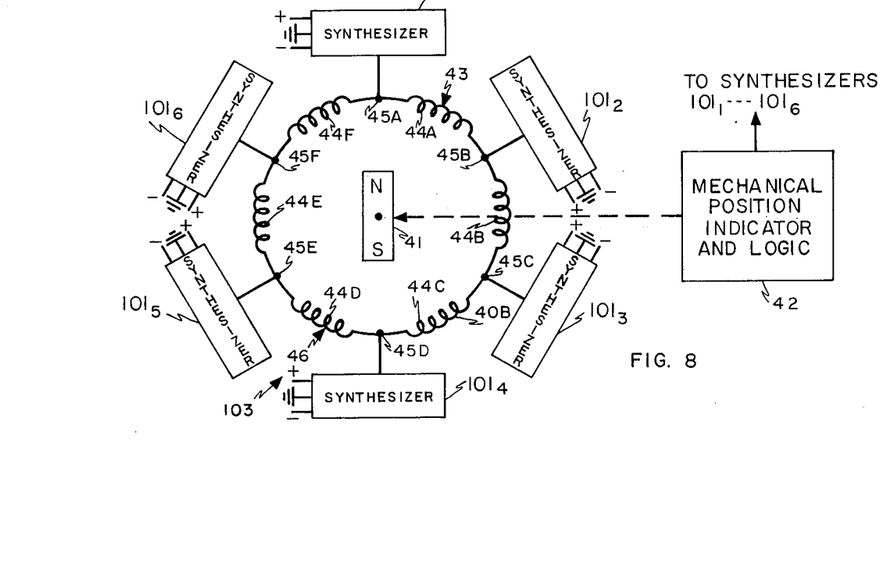
FIG. 8 is a schematic representation, partly block diagram in form, showing a plurality of electronic waveform synthesizers powering a rotating electric machine having a multi-coil closed loop winding.

The system numbered 103 in FIG. 8 is another rotating electronic machine that has a multi-coil (i.e., six-coil) winding 43, comprising coils 44A . . . 44F, of a rotating electric machine 40B. The winding 43 is energized by synthesizers $101_1$ . . . $101_6$, each of which can be similar to the synthesizer 101B in FIG. 2A, connected to winding nodes 45A . . . 45F, respectively, to control energy transfer between the machine 40B and the synthesizers $101_1$ . . . $101_6$. A mechanical position indicator 30 and logic 42 notes the position of a rotor 41 (which is shown as a permanent magnet) to provide appropriate switching signals to the synthesizers $101_1$ . . . $101_6$. (By way of background for closed loop windings of the type shown in FIG. 8, attention is called to U.S. Letters Pat. No. 3,909,684 (Smith, Jr.) and 3,619,746 (Thornton et al.)) Again, the machine 40B can operate in a motoring mode and/or in a generating mode.

Figure 9A:
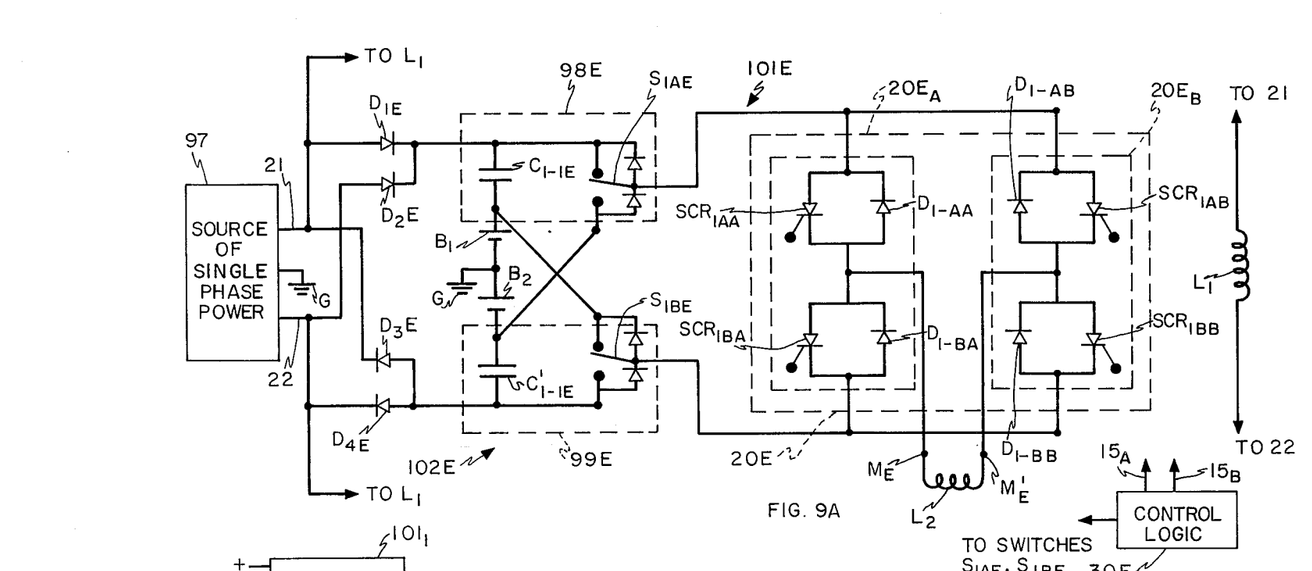
FIG. 9A is a schematic representation, partly block diagram in form, of a system wherein the output of a single-phase source of electric energy is processed to provide a polyphase electric energy which is connected to a rotating electric machine, one coil of the winding of the two-phase machine shown being connected directly across the line of the incoming single-phase source and the other coil thereof being connected through a phase-shifter.
Figure 9B:
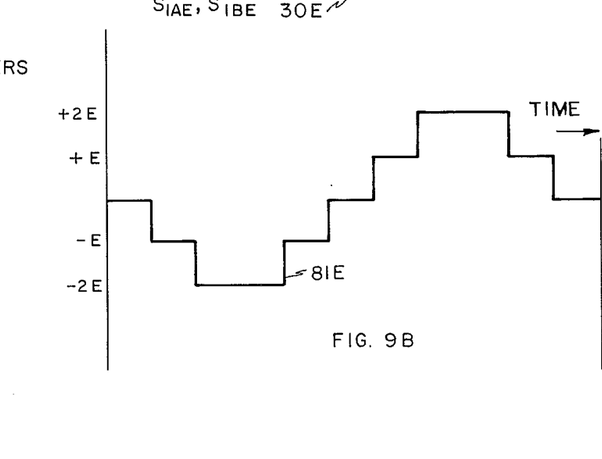
FIG. 9B is an ac, time-voltage diagram of the output of the phase-shifter portion of the system of FIG. 9A.

The explanation now with reference to FIGS. 9A and 9B should be read keeping in mind the above discussion as well as the Kirtley et al application since, like the latter, the system shown at 102E in FIG. 9A is an electronic motor that comprises an electronic waveform synthesizer 101E and a polyphase rotating electric machine comprising coils $L_1$ and $L_2$ (i.e., the coils $L_1$ and $L_2$ form the two-phase winding of a polyphase machine which may have a squirrel cage rotor—not shown—for example). The synthesizer 101E, as later explained, consists of two single-stage units 98E and 99E whose outputs are connected to electronic mixer means 20E.

The electronic mixer means 20E consists of a first mixer section $20E_A$ and a second mixer section $20E_B$. The section $20E_A$ includes thyristors $SCR_{1AA}$ and $SCR_{1BA}$ connected back-to-back with diodes $D_{1-AA}$ and $D_{1-BA}$, respectively; the section $20E_B$ includes thyristors $SCR_{1AB}$ and $SCR_{1BB}$ connected back-to-back with diode $D_{1-AB}$ and $D_{1-BB}$, respectively. The thyristors $SCR_{1AA}$ and $SCR_{1BA}$ are rendered active and inactive by signals carried by a conductor 15A that connects the gates thereof to control logic 30E; the gates of the thyristors $SCR_{1AB}$ and $SCR_{1BB}$ are connected to the logic 30E by a conductor 15B. (Generally the conductors 15A and 15B, as well as the conductor 15 before discussed, are a plurality of conductors.)

The system 102E is connected to receive input power from a single phase source 97 (which may be the single phase 120/240 volt input to a house, say, from the power company; G indicates the neutral connection and can be actual earthing); the coil $L_1$ is connected across the outside leads shown at 21 and 22 of the source 97 (which leads are usually 240 volts in the conventional systems in the United States) and the coil $L_2$ is connected between the first mixer section $20E_A$ and the second mixer section $20E_B$; that is, the coil $L_2$ is connected to receive the outputs labeled $M_E$ and $M'_E$ of sections $20E_A$ and $20E_B$, respectively, the inputs to the sections being the outputs of the units 98E and 99E. The inputs to the units 98E and 99E are from the source 97 through a full wave rectifier comprising diodes $D_{1E}$ . . . $D_{4E}$.

The unit 98E includes a capacitor $C_{1-1E}$ and a bilateral switch $S_{1AE}$; the unit 99E includes a capacitor $C'_{1-1E}$ and a bilateral switch $S_{1BE}$. It will be appreciated that the switch $S_{1AE}$ can be identical to the combined switch $S_{1-1A}$ and $S_{2-1A}$ of FIG. 1 and the switch $S_{1BE}$ can be identical to the combined switch $S_{1-1B}$ and $S_{2-1B}$. The control logic 30E controls the stage switches $S_{1AE}$ and $S_{1BE}$ along with the mixer thyristors, in an appropriate fashion to synthesize the waveform shown at 81E in FIG. 9B, which is the waveform applied to the coil $L_2$. It can be shown that appropriate switching of the switches $S_{1AE}$ and $S_{1BE}$ together with the thyristors in the mixer 20E will provide the two-step waveform 81E. It will be appreciated that each unit 98E and 99E can consist of more than one stage to increase the number of steps in the waveform, that the widths of the steps can be changed to modify the rms voltage, as before, and that each step can be composed of multi-pulses, as before. The batteries $B_1$ and $B_2$ serve to reverse bias the thyristors in the same way that the like batteries in FIG. 2A perform.

A number of further matters with regard to the embodiment of FIG. 9A are contained in this paragraph. It will be appreciated that the inductance of the coil $L_2$ is such that a path must be provided for the current flow in the coil during switching of the various semiconductor devices in the synthesizer 101E; such a path is provided by the diodes $D_{1-AA}$ . . . in the mixer 20E and the unmarked diodes (which correspond to the diodes $D_{1-1}$ . . . of FIG. 1) associated with the switches $S_{1AE}$ and $S_{1BE}$ all of which perform as freewheeling diodes in the synthesizer. The capacitor $C_{1-1E}$ and $C'_{1-1E}$ operate mostly in a dc voltage mode, that is, the voltage across the capacitor terminals does not change polarity; hence, these capacitors are operated in a dc mode and can be smaller than the ac capacitors of the same KVA rating that are used in conventional single-phase capacitor start/and/or run motors that the system of FIG. 9A is intended to replace. The polyphase machine in FIG. 9A is a two-phase machine, and the synthesizer 101E serves to shift the phase of the incoming voltage about 90 electrical degrees as discussed in the Kirtly et al application. It will be appreciated that the shift in time phase can be other than 90 electrical degrees and that the system 101E can be used, say, to power a three-phase motor in an open delta system in the manner described in the Kirtley et al application. The batteries $B_1$ and $B_2$ in FIG. 9A like the similarly labeled elements in FIG. 2A constitute low voltage means to provide the voltage $\Delta V$ that serves to back bias the thyristors $SCR_{1AA}$ . . . ; again, the batteries are connected through the stage switches (here switches $S_{1AE}$ and $S_{1BE}$) to provide a reverse bias to the thyristors at an appropriate time in the cycle of the synthesizer in the manner previously discussed herein.

Figure 10:
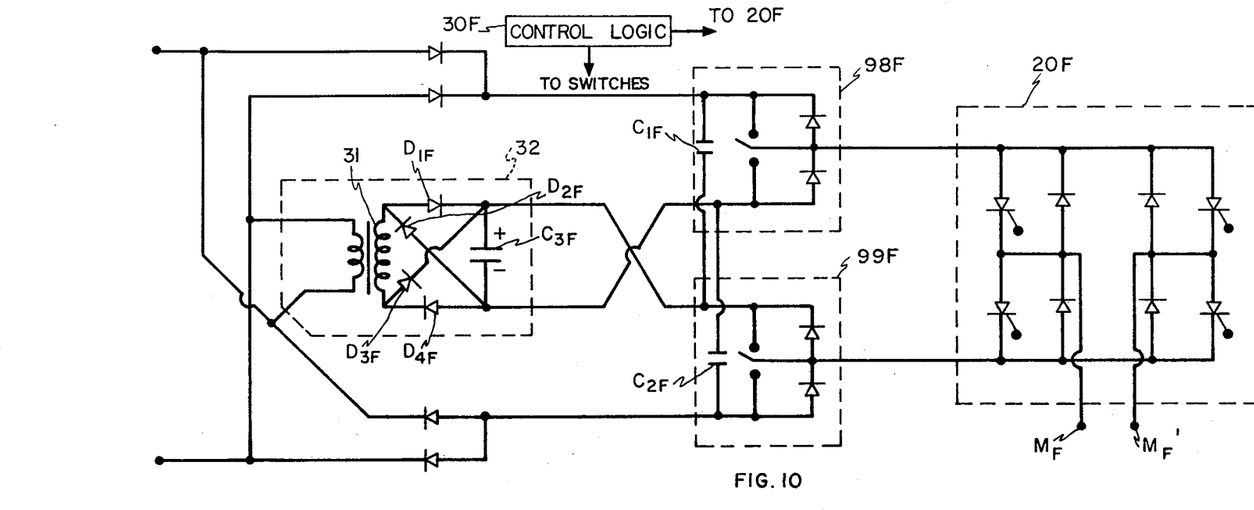
FIG. 10 is a schematic representation, partly block diagram in form, of a modification of the phase-shifter portion of the system of FIG. 9A.

The synthesizer shown at 101F in FIG. 10 is like the synthesizer 101E; units 98F and 99F can be identical to the units 98E and 99E and mixer 20F can be identical to the mixer 20E; and the output waveform at outputs $M_F$ and $M'_F$ can be identical to the waveform 81E and can be modified in the same manner as the waveform 81E. The disclosure of FIG. 10 is intended to show a different arrangement 32 (i.e., different low voltage means) for effecting back biasing of the thyristors in the mixer 20F; that is, another way to provide the low voltage $\Delta V$ referred to earlier herein. The low voltage means 32 includes a transformer 31, full-wave rectifying diodes $D_{1F} \ldots D_{4F}$ and a capacitor $C_{3F}$. The transformer 31 can be a filament transformer; the polarities are indicated. The control logic marked 30F can be digital logic to perform the same functions as the logic discussed previously herein.

Figure 11:
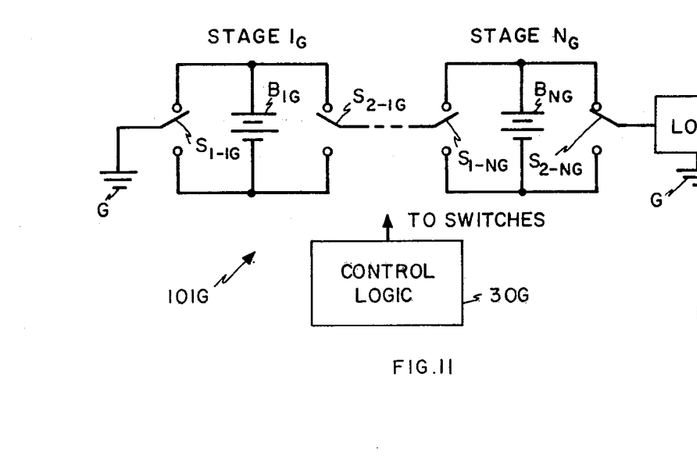
FIG. 11 is a schematic representation, partly block diagram in form of a modification of the system of FIG. 1.

The electronic synthesizer designated 101G in FIG. 11 comprises a plurality of stages, Stage 1 . . . Stage N, connected in cascade, each stage comprising dc or unidirectional supply voltage means $B_{1G} \ldots B_{NG}$ and bilateral stage switch means $S_{1-G} - S_{2-1G} \ldots S_{1-NG} - S_{2-NG}$, the bilateral stage switch means serving to control electric current flow in the dc or unidirectional supply voltage means of the stage as well as to effect an electrical bypass of the dc or unidirectional supply voltage means of the stage. See said patent 3,867,643 (Baker et al). Control logic 30G activates the bilateral switch $S_{1-G}$ to provide as output to a load a waveform, for example, like any of the waveforms of FIGS. 3A — 3G or those of FIGS. 5B — 5K. In other words, the logic 30G, which may be a slightly modified version of the logic in FIG. 6 hereof, is operable to control the rms value of the voltage waveform from the synthesizer 101G as well as the harmonic content thereof, the synthesized waveform, as before, being generated as steps whose widths are modified to affect the rms value and harmonic content and, if desired or required, each step being synthesized as a plurality of pulses whose pulse width is much less than half the wavelength of the ac waveform synthesized, at least one of pulse width and pulse timing being controlled by the control logic means 30G to establish an acceptable level of harmonic distortion in the waveform thereby synthesized.

Further modifications of the invention herein described will occur to persons skilled in the art and all such modifications are deemed to be within the spirit and scope of the invention as defined by the appended claims.

What is claimed is:

1. An electronic waveform synthesizer having, in combination:
   a first unit comprising a stage that includes dc or unidirectional supply voltage means whose output voltage is at the amplitude E and bilateral stage switch means, the bilateral stage switch means serving to control electric current flow in the dc or unidirectional supply voltage means of the stage and serving as well to effect an electrical bypass of the dc or unidirectional supply voltage means of the stage;
   a second unit comprising a stage that includes dc or unidirectional supply voltage means whose output voltage is at the amplitude E and bilateral stage switch means, the bilateral stage switch means serving to control electric current flow in the dc or unidirectional supply voltage means of the stage and serving as well to effect an electrical bypass of the dc or unidirectional supply voltage means of the stage;
   electronic mixer means connected to the first unit and the second unit, said electronic mixer means comprising a plurality of bilateral mixer switches connected to receive the dc or unidirectional electric potential of the dc or unidirectional supply voltage means of the stage of each unit and operable to process the same in a determined and programmable fashion so that there appears at an output port of the electronic waveform synthesizer a waveform that is alternating in nature even though the supply voltage means of each stage and each unit is dc or unidirectional in nature the output of the electronic mixer means being the output that appears at said output port; and
   control logic means that serves to activate the bilateral stage switch means of both the first unit and the second unit, as well as the electronic mixer switch means, in a programmable fashion.

2. An electronic waveform synthesizer as claimed in claim 1 in which the electronic mixer means operates to mix the outputs of the first unit and the second unit to provide an alternating output waveform from the synthesizer that is successively the output of the first unit, then the output of the second unit, then the output of the first unit, and so forth.

3. An electronic waveform synthesizer as claimed in claim 2 wherein each bilateral mixer switch comprises a thyristor and a diode connected in opposite polarity, the synthesizer including low voltage means to reverse bias the thyristor.

4. An electronic waveform synthesizer as claimed in claim 1 the output waveform of the synthesizer is a stepped wave whose steps are variable over a wide range to affect the rms voltage of the output waveform and wherein the control logic means comprises digital logic means that accepts a number that, in turn, determines the width of the steps that form the waveform.

5. An electronic waveform synthesizer as claimed in claim 4 wherein the digital logic means includes resettable up/down counter means that receives the number and provides a count up and a count down that is a function of the number which establishes the step width on the basis of the number so received.

6. An electronic waveform synthesizer as claimed in claim 1 wherein each said unit comprises a plurality of stages as defined by claim 1 connected in cascade and wherein the control logic means serves to program the interconnection of the voltage supply means of the stages of each unit as well as to combine the units to provide an output waveform.

7. An electronic waveform synthesizer as claimed in claim 6 wherein the dc or unidirectional supply voltage means of the first stage of the plurality of stages of each unit is a battery and the supply voltage means of each successive stage is a capacitor.

8. An electronic waveform synthesizer as claimed in claim 7 wherein the battery in said first stage is rechargeable and wherein the control logic means serves to permit power flow into the electronic waveform synthesizer as well as out of the electronic waveform synthesizer.

9. An electronic waveform synthesizer as claimed in claim 1 wherein the dc or unidirectional supply voltage means is a battery.

10. An electronic waveform synthesizer as claimed in claim 1 wherein the dc or unidirectional supply voltage means is a capacitor.

11. An electronic waveform synthesizer as claimed in claim 1 wherein the dc or unidirectional supply voltage means is a solar cell or a fuel cell.

12. Apparatus that comprises a plurality of electronic waveform synthesizers as claimed in claim 1 and that further includes a variable-speed rotating electric machine connected to receive an input thereto the output of the plurality of electronic waveform synthesizers that serves as an N-phase polyphase supply for said machine.

13. Apparatus that comprises a plurality of electronic waveform synthesizers as claimed in claim 1 that further includes a variable-speed rotating electric machine connected to receive as input thereto the output of the plurality of electronic waveform synthesizers, wherein the machine comprises an armature winding having an even number of coils connected in a closed loop configuration with a winding node between adjacent coils and wherein an electronic waveform synthesizer of said plurality is connected to each winding node to introduce electric current to the node and to receive electric current from the node, the control logic means being operable to control the flow of current at the nodes such that in an operating system a rotating magnetic field is generated in said machine.

14. An electronic waveform synthesizer as claimed in claim 1 in which the control logic means cycles the bilateral stage switch means and the bilateral mixer switch means such that the waveform synthesized comprises a plurality of pulses whose voltages are at the amplitude E and whose pulse widths are much narrower than one-half cycle of the waveform, the occurrence of the pulses being timed to affect the harmonic content of the waveform.

15. An electric waveform synthesizer as claimed in claim 14 wherein the widths of the pulses that make up the waveforms are controlled also to affect the harmonic content.

16. Apparatus that comprises a plurality of electronic waveform synthesizers as claimed in claim 1 and that further includes a rotating electric machine, the waveform synthesizers and the rotating electric machine being interconnected to permit electric power transfer therebetween.

17. Apparatus as claimed in claim 16 wherein the control logic means cycles the bilateral stage switch means and the bilateral mixer switch means such that the waveform synthesized by each electronic waveform synthesizer of said plurality produces a quasi-sinusoidal waveform square or stepped waves, said control logic means acting to vary the widths of the steps that form the quasi-sinusoidal waveform over a wide range to control the rms voltage and hence the power transfer between the plurality of waveform synthesizers and the rotating electric machine.

18. Apparatus as claimed in claim 17 wherein said rotating electric machine is an electric motor and wherein the synthesizer varies the frequency of the waveform delivered thereto, and thus the speed of the motor, as well as the electrical power transfer thereto.

19. Apparatus as claimed in claim 17 wherein said rotating electric machine receives electric power from the plurality of waveform synthesizers in a motoring mode of operation and in which said rotating electric machine delivers electric power from the plurality of waveform synthesizers in a generating mode of operation.

20. Apparatus as claimed in claim 17 wherein said wide range is between some maximum value and zero.

21. Apparatus as claimed in claim 17 wherein each half of the quasisinusoid thus synthesized by each synthesizer of said plurality comprises a plurality of pulses whose pulse widths, spacings and/or number are controlled and varied over said range to affect the harmonic content of the waveform thus synthesized.

22. An electronic waveform synthesizer as claimed in claim 1 in which the control logic means cycles the bilateral stage switch means and the bilateral mixer switch means such that the waveform synthesized comprises a quasi-sinusoid synthesized as stepped waves, the widths of the steps that form the quasi-sinusoidal waveform being variable over a wide range to control the rms voltage and hence the power that can be delivered to a load.

23. An electronic waveform synthesizer as claimed in claim 22 wherein said wide range is from some maximum value to zero.

24. An electronic wavefory synthesizer as claimed in claim 22 wherein each half of the quasi-sinusoid thus synthesized comprises a plurality of pulses whose pulse widths, spacings and/or number are controlled and varied over said range to affect the harmonic content of the waveform thus synthesized.

25. An electronic waveform synthesizer as claimed in claim 22 wherein each half of the quasi-sinusoid thus synthesized comprises a plurality of pulses, at least one of pulse width, pulse spacing and number of pulses being controlled to affect the harmonic content of the waveform thus synthesized.

26. An electronic ac waveform synthesizer having, in combination: a plurality of stages, each stage comprising dc or unidirectional supply voltage means and bilateral stage switch means, the bilateral stage switch means serving to control electric current flow in the dc or unidirectional supply voltage means of the stage as well as to effect an electrical bypass of the dc or unidirectional supply voltage means of the stage; and control logic means that serves to activate the bilateral stage switch means to determine the shape of said ac waveform, the control logic means controlling the switching of the bilateral stage switch means such that the waveform synthesized comprises a plurality of steps forming each half wavelength thereof, the steps that form each half wavelength of the synthesized ac waveform comprising substantially fixed amplitude pulses whose pulse widths are much less than half the wavelength of the ac waveform synthesized, at least one of the pulse width and the pulse timing being controlled by the control logic means to establish an acceptable level of harmonic content in the waveform.

27. An electric waveform synthesizer as claimed in claim 26 that further includes electric mixer means connected to receive the waveform from the plurality of stages, said electric mixer means comprising a plurality of bilateral mixer switch means connected to receive a dc or unidirectional electric potential from the plurality of stages and operable to process the same in a determined and programmable fashion so that there appears at the output port of the electronic synthesizer a waveform that is alternating in nature even though the electric potential from the plurality of stages is dc or unidirectional in nature, the harmonic content of the alternating waveform being determined under the direction of the control logic means.

28. An electric waveform synthesizer as claimed in claim 26 wherein the bilateral stage switch means of each stage is capable of reversing the polarity between ports of the stage and wherein the control logic means of the plurality of stages serves to produce at the output of the synthesizer a waveform that is alternating in nature and which contains an acceptable level of harmonic content.

29. An electronic rotating machine that comprises, in combination: a plurality of electronic waveform synthesizers each of which comprises a plurality of stages, each stage comprising dc or unidirectional supply voltage means and bilateral stage switch means, the bilateral stage switch means serving to control electric current flow in the dc or unidirectional supply voltage means of the stage as well as to effect an electrical bypass of the dc or unidirectional supply voltage means of the stage, and control logic means that serve to activate the bilateral stage switch means to determine the shape of said waveform, the control logic means controlling the switching of the bilateral stage switch means such that the waveform synthesized is quasi-sinusoidal and comprises square waves whose widths are variable over a wide range to control the rms voltage of the waveform and hence the power delivered by the synthesizers, each half cycle of the wave synthesized comprising a plurality of said square waves, which square waves comprise many pulses whose widths are much less than the half wavelength of the synthesized at least one of the pulse width and the pulse timing being controlled by the control logic means to establish an acceptable level of harmonic content in the waveforms; and a polyphase rotating electric machine connected to the plurality of waveform synthesizers.

30. An electronic rotating machine as claimed in claim 29 in which the rotating electric machine is an electric motor whose speed is controlled by varying the frequency of the waveforms synthesized and in which the electric power transfer between the plurality of synthesizers and the electric motor is regulated by regulating the width of said square waves.

31. An electronic rotating machine as claimed in claim 29 in which the polyphase rotating electric machine is adapted to perform motoring functions as well as generating functions and in which the control logic means and the plurality of waveform synthesizers interact to permit interchange of energy in either directions between the synthesizers and the polyphase rotating electric machine as well as to monitor the electrical power transfer therebetween.

32. An electronic alternating waveform synthesizer having, in combination, dc or unidirectional supply voltage means comprising a plurality of dc or unidirectional electric power supplies, switch means operable to connect the dc or unidirectional power supplies to an output port of the synthesizer, control logic means connected to activate the switch means in a programmable fashion so that there appears at said output port an electric waveform that is alternating in nature even though the supply voltage means is dc or unidirectional in nature, each half cycle of the waveform being formed solely of a plurality of steps or square waves of electric energy from the dc or unidirectional supply voltage means, said control logic means being adapted to control the width of said steps or square waves to monitor the interchange of electric energy at said port, each half-cycle of the waveform synthesized comprising many substantially fixed amplitude pulses, at least one of pulse width and pulse timing being controllable by the control logic means to establish an acceptable level of harmonic content in the waveform, the control logic means being operable to control the switch means to generate said pulses with pulse widths of the pulses forming each half-cycle much less than half the wavelength of the ac waveform synthesized.

33. An electronic alternating waveform synthesizer as claimed in claim 32 in which the control logic means controls the switch means to interconnect, the plurality of dc or unidirectional power supplies to provide said alternating waveform in the form of multiple steps in each half cycle thereof, said steps comprising said pulses and in which the frequency of the waveform is variable from about zero to some frequency much greater than zero.

34. Apparatus that comprises, in combination: a polyphase load and a voltage waveform synthesizer interconnected to permit the apparatus to connect to a single phase line, one phase of the polyphase load being adapted to connect directly to the single phase line and another phase thereof being connected through the voltage waveform synthesizer to the single phase line, said synthesizer comprising a first unit comprising a stage that includes dc or unidirectional supply voltage means and bilateral stage switch means, the bilateral stage switch means serving to control electric current flow in the dc or unidirectional supply voltage means of the stage and serving as well to effect an electrical bypass of the dc or unidirectional supply voltage means of the stage, a second unit comprising a stage that includes dc or unidirectional supply voltage means and bilateral stage switch means, the bilateral stage switch means serving to control electric current flow in the dc or unidirectional supply voltage means of the stage and serving as well to effect an electrical bypass of the dc or unidirectional supply voltage means of the stage, electronic mixer means connected to the first unit and the second unit, said electronic mixer means comprising a plurality of bilateral mixer switches connected to receive the dc or unidirectional electric potential of the dc or unidirectional supply voltage means of the stage of each unit and operable to process the same in a determined and programmable fashion so that there appears at an output port of the electronic waveform synthesizer a waveform that is alternating in nature even though the supply voltage means of each stage and each unit is dc or unidirectional in nature, and control logic means that serves to activate the bilateral stage switch means of both the first unit and the second unit, as well as the electronic mixer switch means, in a programmable fashion.

35. Apparatus as claimed in claim 34 wherein the polyphase load is a polyphase rotating machine.

36. Apparatus as claimed in claim 35 wherein the polyphase rotating machine is a two-phase electric motor one phase of which is adapted to connect directly across the single-phase line and the other phase of which is connected to the synthesizer which serves as a phase shifter.

37. An electronic waveform synthesizer as claimed in claim 3 in which the low voltage means comprises an electrical bridge configuration that includes a source of positive and negative electric potential connected through the bilateral stage switch means of the first unit and the bilateral stage switch means of the second unit to the thyristors of the bilateral mixer switches that serve to connect the appropriate low voltage reverse bias to the thyristor of each bilateral mixer switch.

38. An electronic waveform synthesizer as claimed in claim 37 wherein the first unit is a positive unit that presents a positive voltage waveform to the mixer means in an operating system and the second unit is a negative unit that presents a negative voltage waveform to the mixer means, and wherein the mixer means includes a pair of thyristors serially connected, the anode of one thyristor being connected through the stage switch means of the first unit to the point of positive electric potential and the cathode of the other thyristor being connected through the stage switch means of the second unit to said point of negative potential.

39. An electronic waveform synthesizer as claimed in claim 37 wherein the mixer means includes two pairs of thyristors serially connected, the serial connection of each pair serving as a connection to the synthesizer to receive a load which is connected between the two serial connections, each thyristor pair having the anode of one thyristor of the pair connected through the stage switch means of the first unit to said point of negative potential and the cathode of one thyristor of the pair connected through the stage switch means of the second unit to said point of negative potential.

40. An electronic waveform synthesizer as claimed in claim 26 in which the control logic means comprises digital logic means comprising counters operable to operate in an up/down counter sequence wherein the down counter is the mirror image of the up count to provide automatic timing symmetry.

41. An electronic waveform synthesizer as claimed in claim 26 wherein the pulses that form each half of the ac waveform are many in number.

42. An electronic waveform synthesizer as claimed in claim 26 in which the bilateral stage switch means and the control logic means interact to interconnect the dc or unidirectional supply voltage means of the plurality of stages to provide a variable frequency waveform whose frequency is variable over a wide range of frequencies and whose harmonic content is controllable, in part, over said wide range of frequencies by control of at least one of the width and timing of said pulses.

43. An electronic waveform synthesizer having, in combination a plurality of dc sources, switch means operable to connect the plurality of dc sources to an output port of the synthesizer, control logic means connected to activate the switch means in a programmable fashion so that there appears at said output port and electric waveform as a plurality of square waves of electric energy formed solely by combining the dc sources, said control logic means being operable to control the width of said square waves and being operable, as well, to form a square wave of a plurality of fixed amplitude pulses, at least one of pulse width and pulse timing being controllable by the control logic means to establish an acceptable level of harmonic content in said square wave, the control logic means being operable to control the switch means to generate said pulses with pulse widths of the pulses forming said square wave much less than the width of the square wave.

* * * * *